United States Patent [19]

Shiina et al.

[11] Patent Number: 5,495,309
[45] Date of Patent: Feb. 27, 1996

[54] CAMERA

[75] Inventors: Michihiro Shiina; Jun'ichi Iwamoto; Fumio Iwai, all of Oomiya, Japan

[73] Assignee: Fuji Photo Optical Co. Ltd., Oomiya, Japan

[21] Appl. No.: 264,986

[22] Filed: Jun. 23, 1994

[30] Foreign Application Priority Data

Jun. 29, 1993 [JP] Japan .................... 5-158921

[51] Int. Cl.⁶ ..................... G03B 13/34; G02B 15/14
[52] U.S. Cl. .............. 354/195.12; 359/694; 359/696
[58] Field of Search .......................... 354/187, 195.1, 354/195.12, 400; 359/696, 697, 698, 694

[56] References Cited

U.S. PATENT DOCUMENTS 5,196,963  3/1993  Sato et al. ................... 359/697
5,223,981  6/1993  Kaneda ........................ 359/698
5,298,933  3/1994  Chigira ........................ 359/698

*Primary Examiner*—A. A. Mathews
*Attorney, Agent, or Firm*—Hickman & Beyer

[57] ABSTRACT

A camera has a two lens group zoom system composed of a front lens group and a rear lens group, and a home position check apparatus of the rear lens group driven by a stepping motor. The home position check apparatus is so arranged that a detection as to if the rear lens group is located at the home position is started only when the rear lens group reaches the predetermined position before the home position. Before the rear lens group reaches the predetermined position, only the movement of rear lens group to the home position is carried out but the home position check of rear lens group is not.

19 Claims, 8 Drawing Sheets

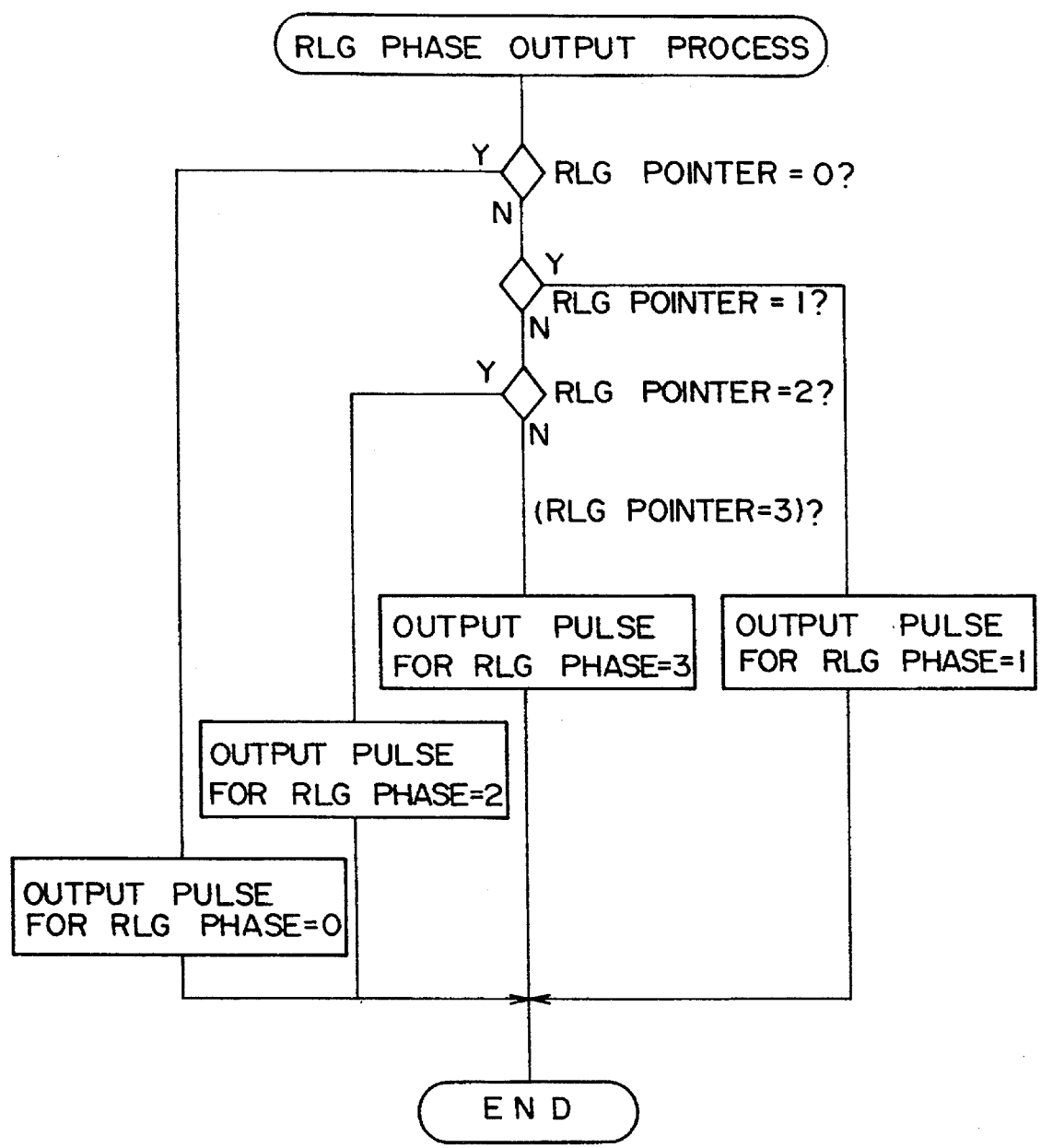

CAMERA

BACKGROUND OF THE INVENTION

1. Field of the Invention

The present invention relates to a camera having a two lens group zoom system composed of a front lens group and a rear lens group, and more particularly to home position check of the rear lens group driven by a stepping motor.

2. Related Background Art

A recent demand is to reduce the outer dimensions of camera, particularly of compact camera. Especially, an important subject is to miniaturize a lens barrel as much as possible. To miniaturize the lens barrel, a recent trend in camera having the two lens group zoom system is to replace a mechanical cam system with a mechanism for driving the front lens group and the rear lens group by separate motors. In such a mechanism, it is general that a direct current motor is used as a motor for driving the front lens group and a stepping motor as a motor for driving the rear lens group.

An example of the two lens group zoom system is one as shown in FIGS. 1A and 1B. A lens barrel 4 of the zoom system 2 is composed of a stationary barrel 6 forming a part of camera body 7, an intermediate barrel 8 telescopically stored in the stationary barrel 6, and a movable barrel 10 telescopically stored in the intermediate barrel 8.

A front lens group (FLG) 22 which consists of one or more lenses is fixed in a front end portion of the moving barrel 10 and is arranged to be driven by a direct current (DC) motor (not shown in FIGS. 1A and 1B) to move backward and forward together with the moving barrel 10.

Also, a rear lens group (RLG) 28 which consists of one or more lenses is arranged behind the front lens group 22 (on the camera body side) in the moving barrel 10 so as to be movable backward and forward. The rear lens group 28 is driven backward and forward by a stepping motor (not shown in FIGS. 1A and 1B).

In such a zoom system 2, a home position (reference position) is defined at a position where the rear lens group 28 is located closest to the front lens group 22 and the position of rear lens group 28 is obtained from a cumulative number of pulse signals (hereinafter referred to as "rear group cumulative pulse number") output to the stepping motor to move the rear lens group 28 from the home position. Whether the rear lens group 28 is located at the home position is detected using a home position sensor composed of a limit switch, a photoelectric sensor or the like.

The conventional zoom systems as described above could have a chance that an actual position of rear lens group is different from a position thereof obtained from the rear group cumulative pulse number if there occurs an abnormality in drive of stepping motor for example because of a decrease in drive voltage. If this positional deviation, i.e., step-out, occurs, the rear lens group cannot be accurately located at the focusing position during exposure, which would cause a problem of out-of-focus, for example.

Therefore, the conventional systems are so arranged that for example when the lens barrel is moved from the collapsed or retracted position to a photographable range or when it is retracted from the photographable range to the retracted position, the rear lens group is moved to the home position and home position check is executed to detect whether the rear lens group is properly located at the home position (that is, it is detected whether the home position sensor is on or off).

However, in the home position check in the conventional systems, the on/off detection of home position sensor is executed every predetermined pulse number movement (for example every unit of four pulses) of rear lens group, which results in performing unnecessary processes while the rear lens group is located considerably apart from the home position. Therefore, an excessive time could be needed for a shift from the home position check process to a next process.

Consequently, a need exists for a way to perform the home position check within as short time as possible.

SUMMARY OF THE INVENTION

According to the present invention, there is provided a camera designed to satisfy the aforementioned needs. The camera comprises: a camera body; a front lens group arranged as movable backward and forward relative to the camera body; a rear lens group disposed between the camera body and the front lens group as movable backward and forward relative to the camera body; a stepping motor for driving the rear lens group; rear lens group position detecting means for detecting a position of the rear lens group, based on a cumulative number of pulse signals output to the stepping motor to move the rear lens group, the cumulative number being a certain value when the rear lens group is located at a home position; and home position check means for detecting whether the rear lens group is properly located at the home position, the home position check means including stepping motor driving means for driving the stepping motor so that the rear lens group is located at the home position, and home position detecting means for detecting whether the rear lens group is located at the home position, wherein, during an operation of the stepping motor driving means, the rear lens group position detecting means is adapted to detect a position of the rear lens group every time the stepping motor is driven by a predetermined number of pulses, and only when the rear lens group position detecting means detects that the rear lens group is positioned between the home position and a predetermined position, the home position detecting means executes a detection as to if the rear lens group is located at the home position every time the stepping motor is driven by a predetermined number of pulses.

The home position is a position where the rear lens group is located closest to the front lens group, and the predetermined position is a position near the home position. Preferably, the predetermined position is a position between the home position and a middle of a range within which the rear lens group can be moved relative to the front lens group.

Using the home position check means of the above structure, the detection as to if the rear lens group is located at the home position is started, only when the rear lens group reaches the predetermined position before the home position. Before the rear lens group reaches the predetermined position, only the movement of rear lens group to the home position is carried out but the home position check of rear lens group is not. Accordingly, the home position check means of the present invention requires a shorter processing time than that by the conventional means which repeats the home position check of rear lens group immediately after the movement start of rear lens group.

The present invention will become more fully understood from the detailed description given hereinbelow and the attached drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which:

FIG. 7 is a flowchart to show an embodiment of RLG phase output process executed in the RLG HP drive process in FIGS. 6A and 6B.

DETAILED DESCRIPTION OF THE PREFERRED EMBODIMENT

A preferred embodiment of the present invention will be described in detail with reference to the drawings. A two lens group zoom system in a camera in the following embodiment is the same as one described with FIGS. 1A and 1B, but the structure thereof will be described in more detail in order to further clarify the content of the present invention.

Figure 1A:
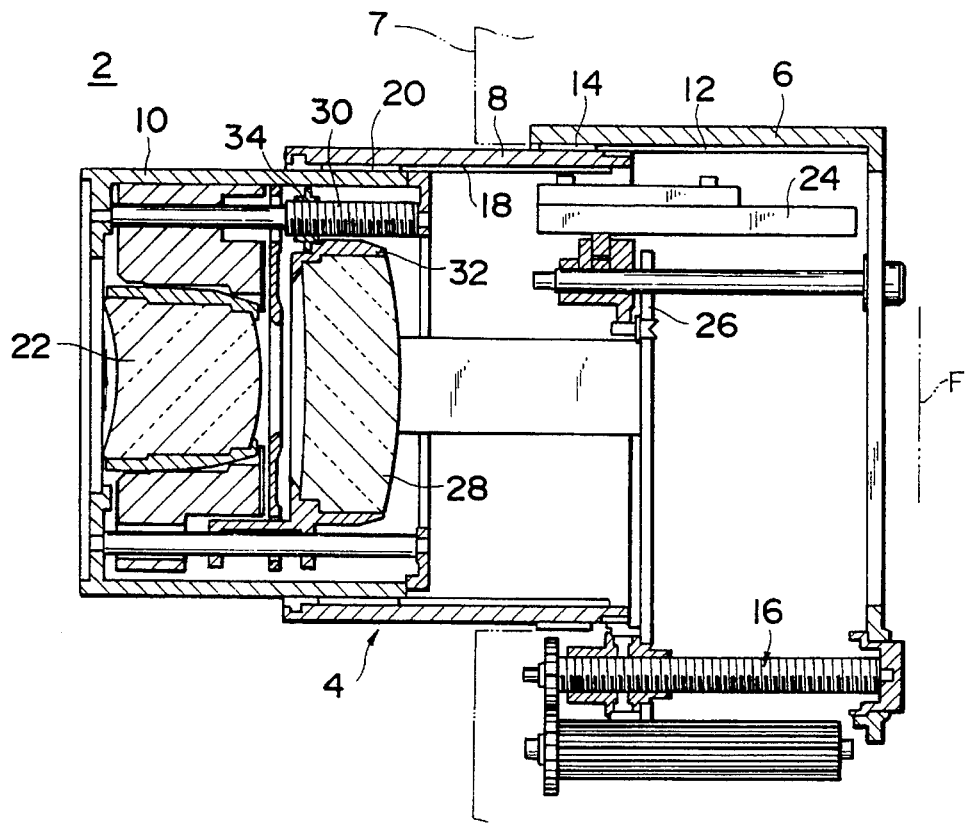
FIG. 1A is a cross sectional view to show the construction of a two lens group zoom system in a camera to which the present invention is applied, showing a state of telephoto extreme.
Figure 1B:
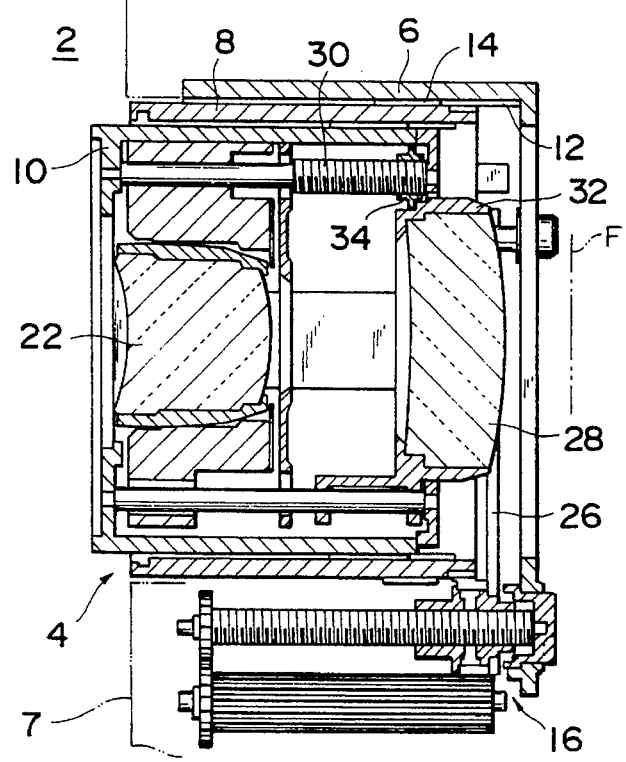
FIG. 1B is a view similar to FIG. 1A, showing a state of wide-angle extreme.

Referring to FIGS. 1A and 1B, a lens barrel 4 of the zoom system 2 is of a three barrel arrangement composed of a stationary barrel 6 forming a part of camera body 7, an intermediate barrel 8 telescopically stored in the stationary barrel 6, and a moving barrel 10 telescopically stored in the intermediate barrel 8.

A spiral groove 12 is formed on the internal surface of the stationary barrel 6, and an engaging portion 14 provided on the outer surface of end portion of the intermediate barrel 8 is meshed with the spiral groove 12. The intermediate barrel 8 is arranged as rotatable in normal and reverse directions by a direct current (DC) motor (not shown in FIGS. 1A and 1B) through a transmission mechanism 16, so that it can extend and contract relative to the stationary barrel 6 with its rotation.

A spiral groove 18 is also formed on the internal surface of the intermediate barrel 8, and an engaging portion 20 on the outer surface of end portion of the moving barrel 10 is meshed with the spiral groove 18. The moving barrel 10 is arranged as incapable of rotating relative to the stationary barrel 6, so that it telescopically moves in the same direction as the telescopic motion of the intermediate barrel 8 when the intermediate barrel 8 is rotated.

A front lens group (FLG) 22 which consists of one or more lenses is fixed in a front end portion of the moving barrel 10. Accordingly, the front lens group 22 is moved backward and forward when drive of the DC motor is controlled to telescopically move the intermediate barrel 8 and the moving barrel 10. Thus, the DC motor functions as a driving motor of the front lens group 22. Numeral 24 designates a position sensor, which detects a position of a moving member 26 moving together with the intermediate barrel 8. Since a position of FLG 22 is uniquely determined by the position of the intermediate barrel 8, the position of FLG 22 can be detected from an output signal from the position sensor 24 whenever necessary.

Also, a rear lens group (RLG) 28 which consists of one or more lenses is arranged behind the front lens group 22 (on the camera body side) within the moving barrel 10 so as to be movable backward and forward. Although not shown in FIGS. 1A and 1B, a two-phase stepping motor is set as RLG driving motor inside the moving barrel 10, and a female screw member 34 integral with a lens frame 32 for RLG 28 is in mesh with a feed screw 30 connected to a rotation shaft of the stepping motor. Accordingly, the rear lens group 28 moves backward and forward by controlling the drive of the stepping motor.

A home position of RLG 28 is a position where the rear lens group 28 is closest to the front lens group 22, and there is a home position sensor (not shown in FIGS. 1A and 1B) provided in the moving barrel 10 to detect if the rear lens group 28 is located at the home position. A position of RLG 28 is calculated from a cumulative number of pulse signals output to the stepping motor. This cumulative pulse number is a certain value, for example "0", when the rear lens group 28 is located at the home position. Various types of home position sensors can be employed in the present invention. The present embodiment employs a limit switch, which is turned on when the rear lens group 28 is located at the home position.

Figure 2:
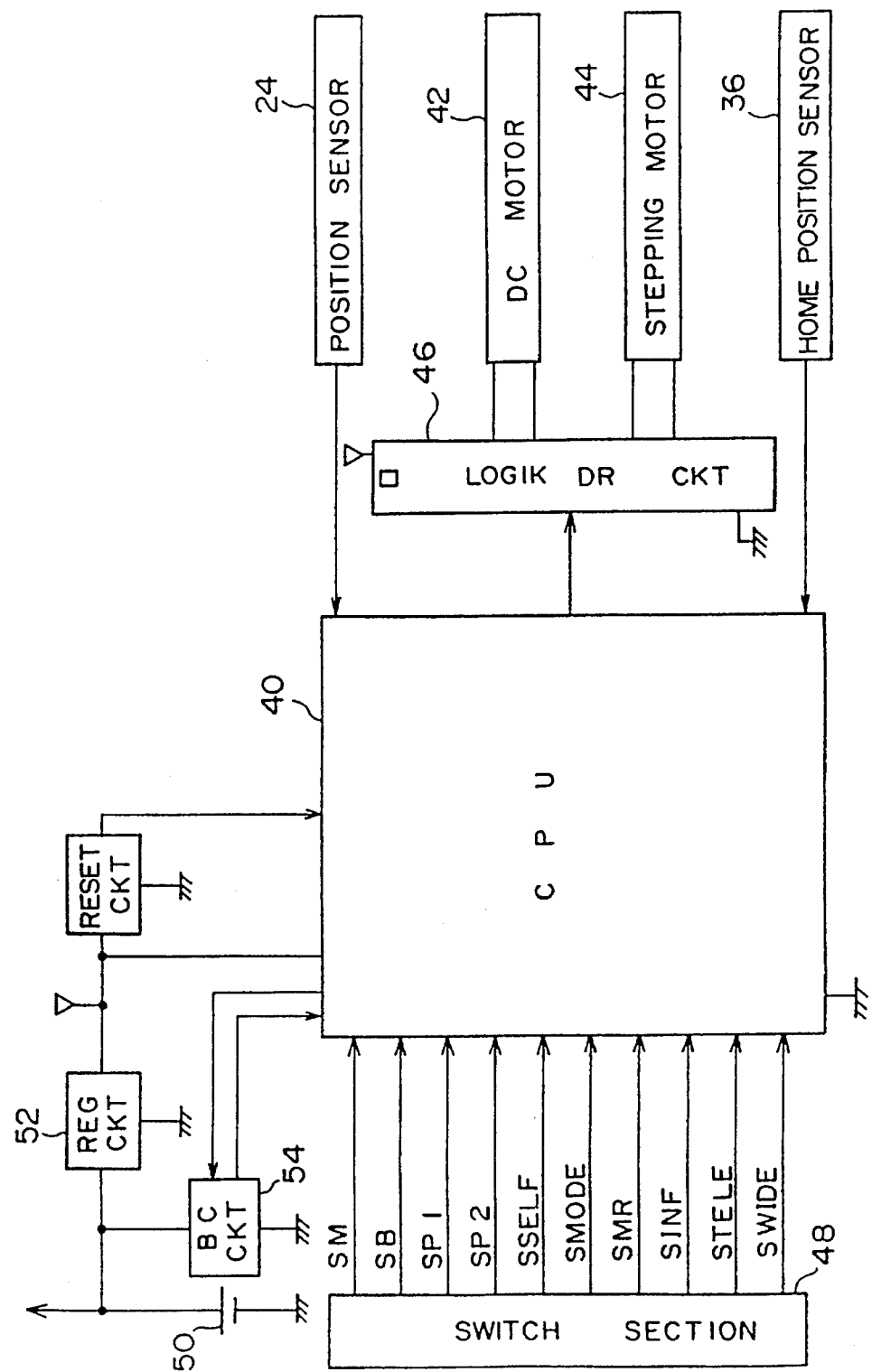
FIG. 2 is a block diagram to show a one-chip type microcomputer or CPU constituting a home position check apparatus according to the present invention.
Figure 3A:
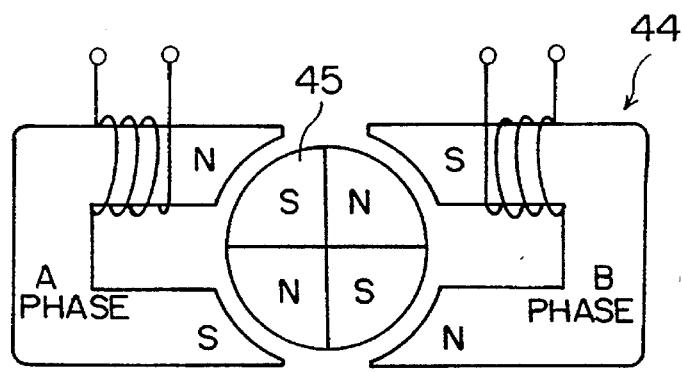
FIGS. 3A to 3D are conceptual drawings to show the structure and operation of a stepping motor for driving a rear lens group in zoom system, respectively.
Figure 3B:
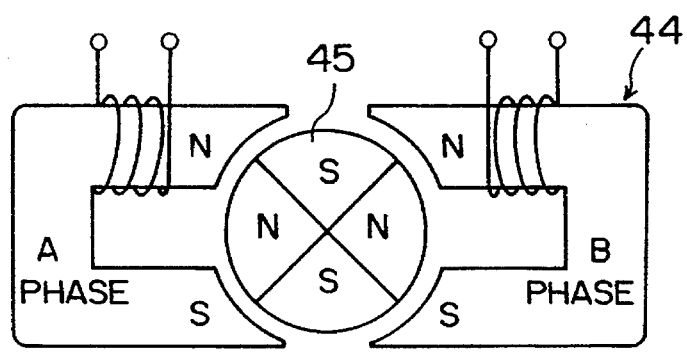
Figure 3C:
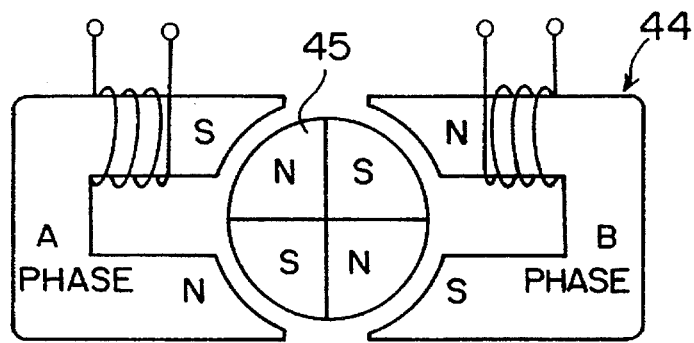
Figure 3D:
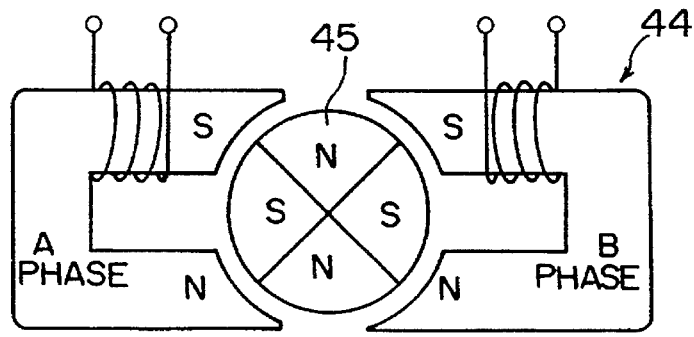

A home position check apparatus according to the present invention for performing home position check of RLG 28 in such zoom system 2 is mainly constructed with a one-chip type microcomputer (referred to as "CPU" in this specification and the attached drawings) 40, as shown in FIG. 2. The DC motor 42 for driving the front lens group 22 and the stepping motor 44 for driving the rear lens group 28 are connected to CPU 40 through a logic driver circuit 46. The logic driver circuit 46 can control rotation and brake of the DC motor 42 while properly applying a high voltage or a low voltage to the DC motor 42 in accordance with a signal from CPU 40. Also, CPU 40 generates pulse signals to the stepping motor 44 in accordance with an energization pattern as shown in the below table, so that A phase and B phase of stepping motor 44 can be suitably energized.

In the below table, an rear lens group pointer (RLG pointer) is RAM data, and CPU 40 energizes the phases of stepping motor 44 in an energization pattern depending upon a value of RLG pointer to move the rear lens group 28 to a next phase. FIGS. 3A to 3D are conceptual drawings to show the structure and operation of stepping motor 44 used in the camera in the present embodiment. FIGS. 3A to 3D show states of RLG pointers "0" to "3", respectively. As seen from FIGS. 3A to 3D, if pulse signals are output in such a cyclic pattern that the value of RLG pointer increases point by point from "0" to "3" and again returns to "0", a rotator 45 of stepping motor 44 normally rotates to move the rear lens group 28 backward, i.e., in the direction to leave the front lens group 22. Also, with pulse signals in such a cyclic pattern that the value of RLG pointer decreases point by point from "3" to "0" and again returns to "3", the stepping motor 44 is reversely rotated to move the rear lens group 28 forward.

TABLE 1

| RLG Pointer | Stepping Motor | |
|---|---|---|
| | A Phase | B Phase |
| 0 | Normal | Normal |
| 1 | Normal | Reverse |
| 2 | Reverse | Reverse |
| 3 | Reverse | Normal |

Also, a switch section 48 is connected to CPU 40. The switch section 48 includes a main switch (SM), a back lid switch (SB), release switches (SP1, SP2) interlocked with a shutter button, a self timer switch (SSELF), a strobe mode switch (SMODE), a forcible rewind switch (SMR), an INF switch (SINF) for shooting of distant view, a zoom switch (STELE) for zooming to the telephoto side, a zoom switch (SWIDE) for zooming to the wide-angle side, etc., on/off signals of which are supplied to CPU 40.

Further connected to CPU 40 are a position sensor 24 for detecting a position of FLG 22 and a home position sensor 36 for detecting the home position of RLG 28.

Further, a battery 50 is connected to CPU 40 through a regulator circuit (REG circuit) 52. The battery 50 also functions as a drive power source for the DC motor 42 and the stepping motor 44. Also, a battery check circuit (BC circuit) 54 is connected to the battery 50 to perform battery check, for example to check a voltage of battery 50, by a control signal from CPU 40 and to supply information of the check to CPU 40.

Next described along the flowcharts in FIG. 4 to FIG. 8 is the home position check according to the present invention, as executed when the lens barrel 4 is retracted from a position in a photographable range to the retracted position in the camera body 7, in the thus arranged zoom system 2.

Figure 4:
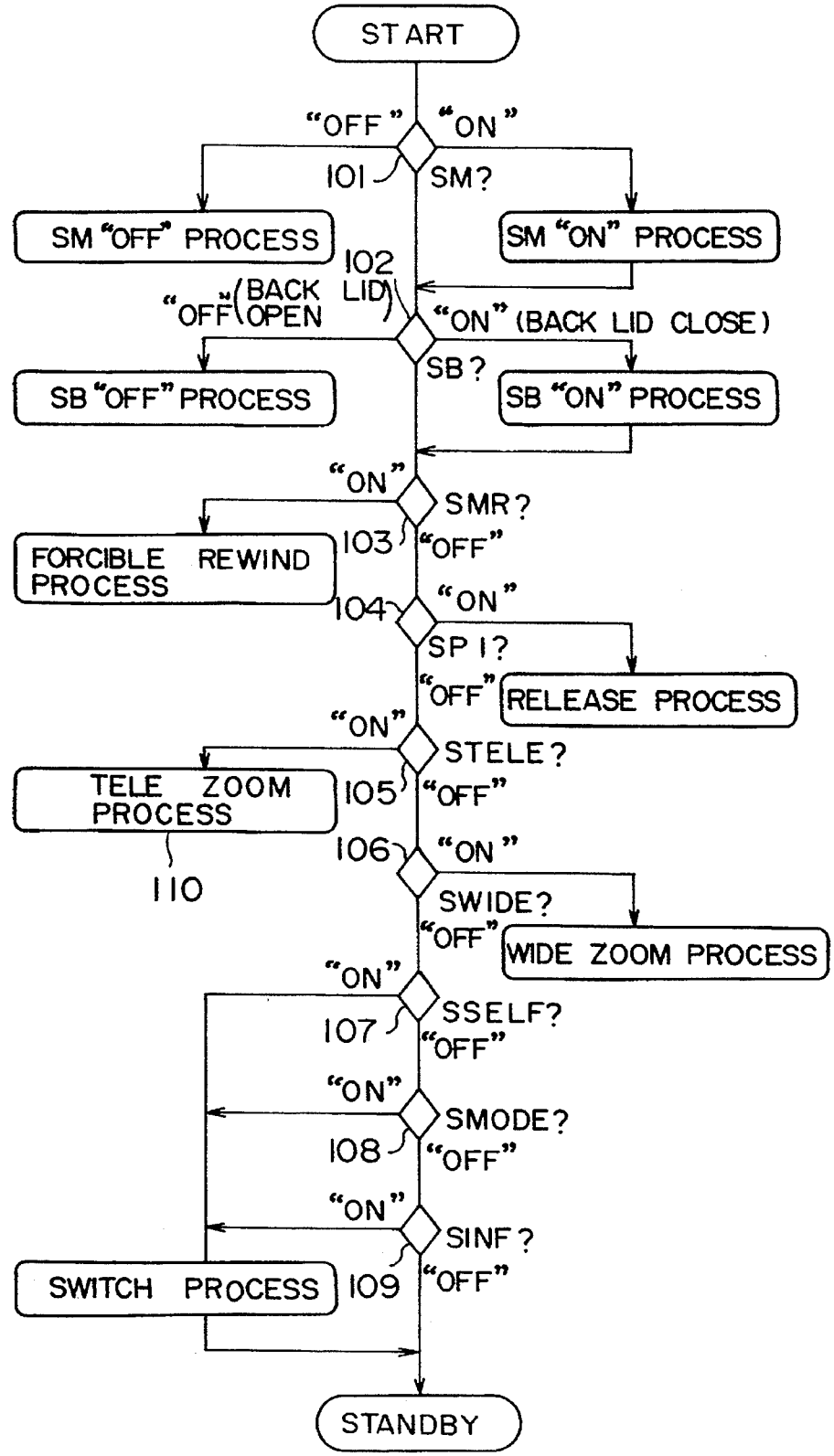
FIG. 4 is a flowchart to show an embodiment of processes before the camera reaches a standby state.

First, FIG. 4 is a flowchart between loading of film into the camera and a standby state (photographable state). Namely, sequential decisions are made as to if the main switch (SM) is turned on (Step 101), if the back lid switch (SB) is turned on after the back lid is closed (Step 102), if the forcible rewind switch (SMR) is off (Step 103), if the shutter button is not pressed while keeping the release switch (SP1) off (Step 104), if the telephoto zoom switch (STELE) is kept off (Step 105), if the wide-angle zoom switch (SWIDE) is kept off (Step 106), the self timer switch (SSELF) is off (Step 107), if the strobe mode switch (SMODE) is off (Step 108), and if the INF switch (SINF) is off (Step 109). If the above conditions all are satisfied, the camera goes into a standby state. Once the camera goes into the standby state, Step 101 to Step 109 are repeated.

With the camera in the standby state, the lens barrel 4 of zoom system 2 is located between the position in the extreme telephoto state shown in FIG. 1A and the position in the extreme wide-angle state shown in FIG. 1B. A process to retract the lens barrel 4 to the retracted position in the camera body 7 is started if the main switch (SM) is turned off or if the camera is not operated for a certain time period. The following description concerns a process executed when the main switch (SM) is turned off. The retracted position of lens barrel 4 in the present embodiment is a position where the moving barrel 10 and the intermediate barrel 8 are further retracted from the position in the extreme wide-angle state shown in FIG. 1B into the stationary barrel 6.

Figure 5B:
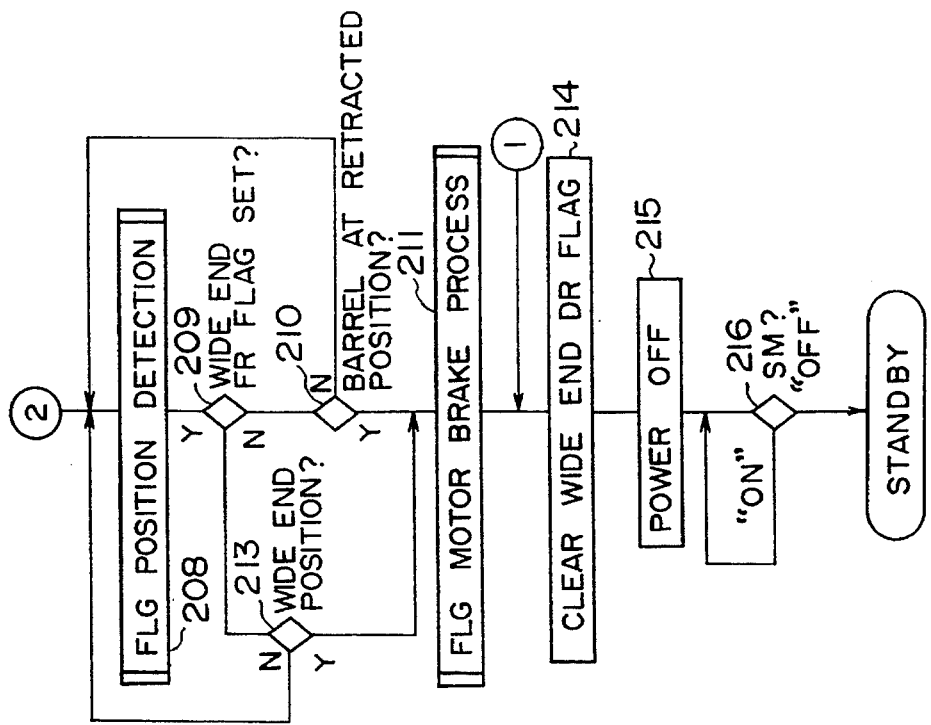
FIGS. 5A and 5B are flowcharts to show an embodiment of SM "off" process.
Figure 5A:
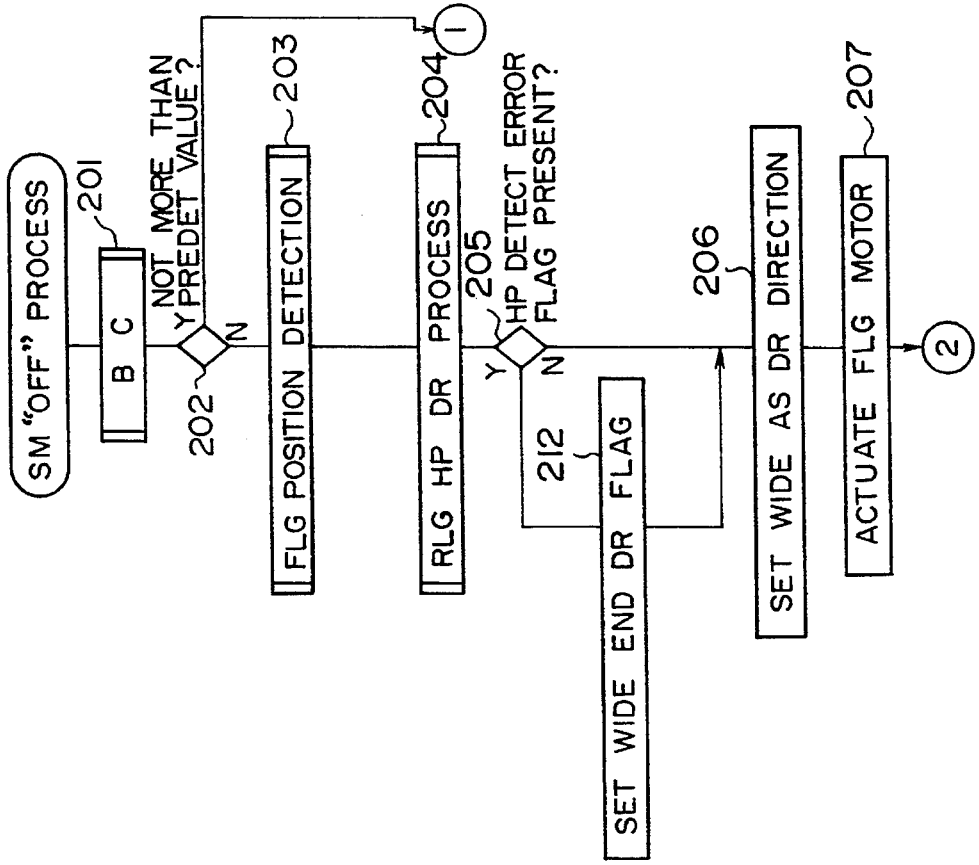

In the SM "OFF" process, as shown in FIGS. 5A and 5B, a battery check (BC) process is first executed to measure a voltage of battery 50 (Step 201) and a decision is made as to if the voltage is not more than a predetermined value (Step 202). If the voltage is not more than the predetermined value, the flow proceeds to Steps 214 to 216 to end this process.

If the voltage of battery 50 is higher than the predetermined value, that is, if the decision is that the voltage is within a normal range, a position of front rear lens 22 is detected from a signal from the position sensor 24 (Step 203), and thereafter a rear lens group HP drive process is executed for performing the home position check of rear lens group 28 (Step 204).

Figure 6A:
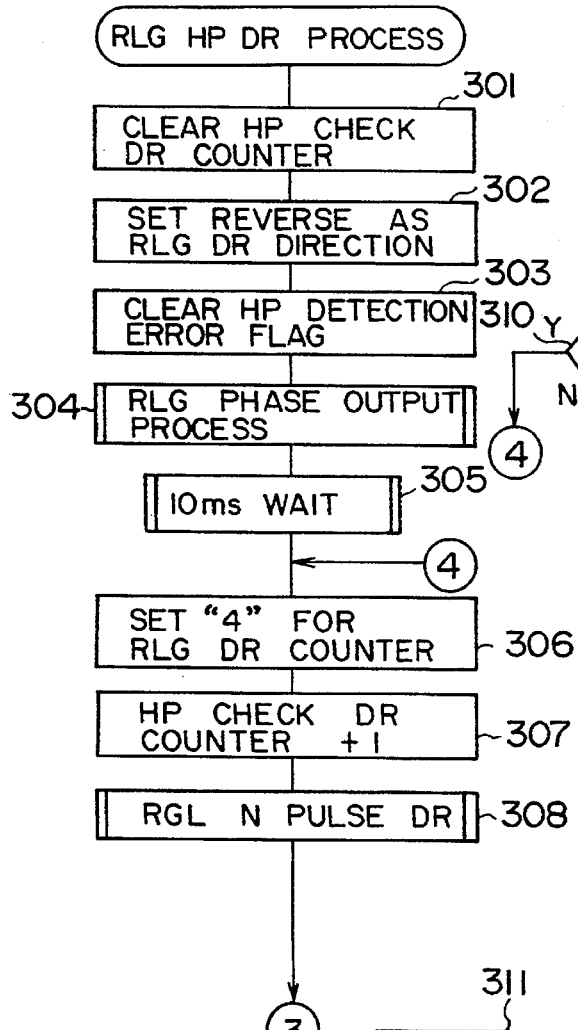
FIGS. 6A and 6B are flowcharts to show an embodiment of RLG HP drive process executed in the SM "off" process in FIGS. 5A and 5B, indicating the content of home position check process.
Figure 6B:
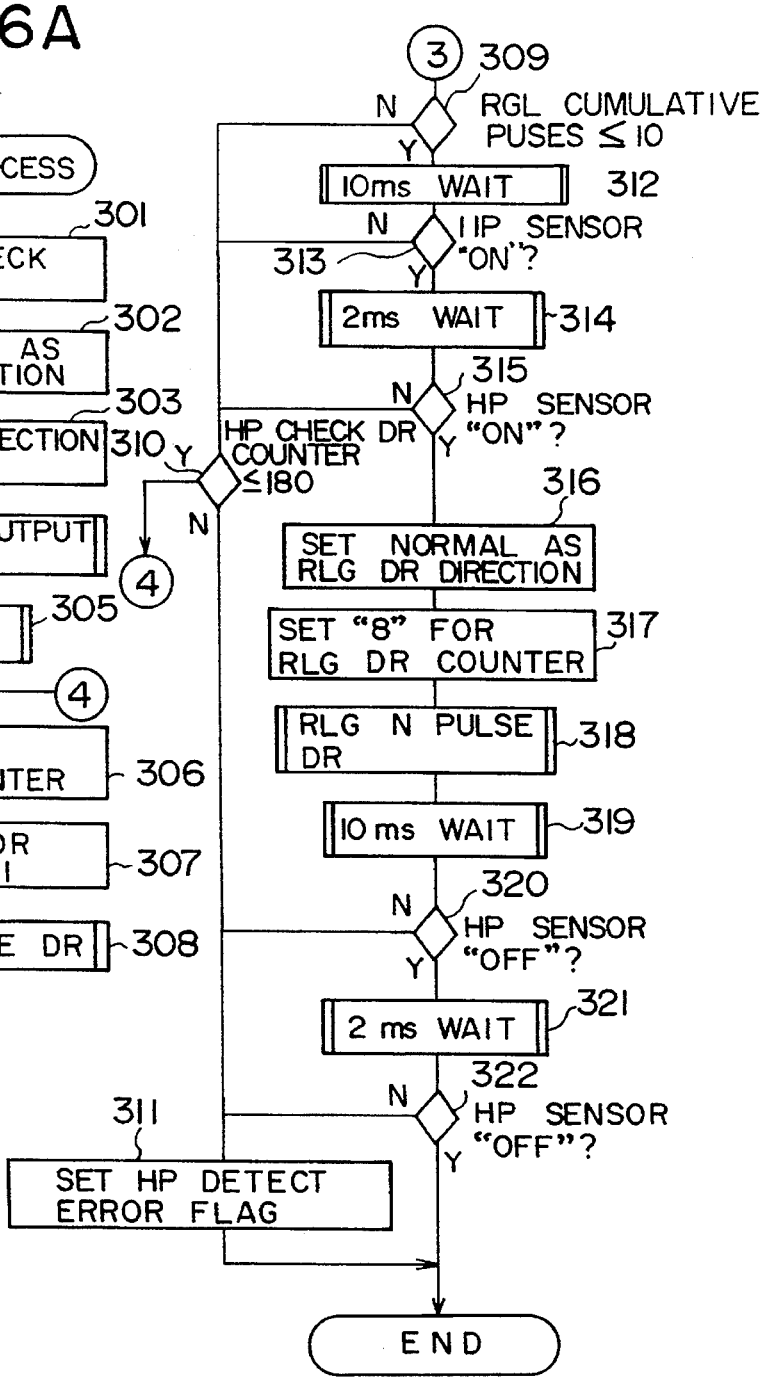

As seen from FIGS. 6A and 6B, the rear lens group HP drive process is a process in which the rear lens group 28 is moved to the home position, and if the limit switch as the home position sensor is not turned on, an HP detection error flag is set under an assumption that there is something abnormal. This process will be described in more detail along FIGS. 6A and 6B.

A first step clears an HP check drive counter indicating a number of times of drive processes applied to the stepping motor 44 for driving the rear lens group 28 (RLG N pulse drive processes) (Step 301), and the drive direction of stepping motor 44 is set to the reverse direction in order to drive the rear lens group 28 toward the front lens group 22, i.e., forward (Step 302). The HP detection error flag is also cleared (Step 303).

Next, an RLG phase output process is carried out to energize the stepping motor 44 with phases according to a value of RLG pointer (Step 304). The RLG phase output process is a process as shown in FIG. 7, in which a predetermined pulse signal is output to achieve a phase of stepping motor 44 (see FIGS. 3A to 3D) according to the value of RLG pointer. At next Step 305 a wait time of constant time, about 10 ms in the present embodiment, is given to stabilize the energization state of stepping motor 44.

Subsequent steps are a process for driving the stepping motor 44 by N pulses (Steps 306 to 308). Here, N represents a numerical value set in the RLG drive counter at Step 306. Accordingly, since "4" is set in the RLG drive counter in this process, the stepping motor 44 is driven by four pulses so as to move the rear lens group 28 forward by a distance corresponding thereto.

Figure 8:
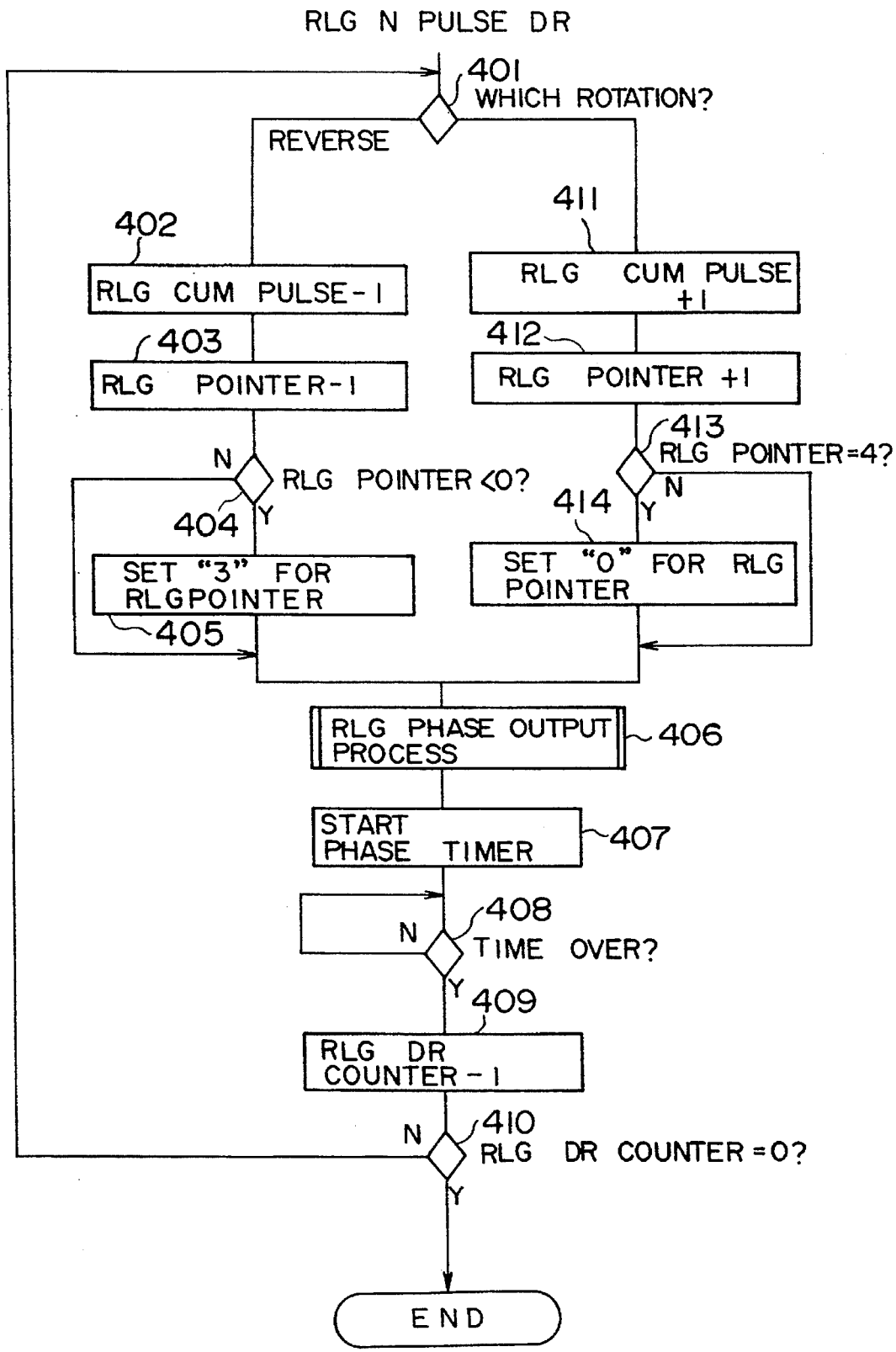
FIG. 8 is a flowchart to show an embodiment of RLG N pulse drive process executed in the rear group RLG HP drive process in FIGS. 6A and 6B.

The details of the process at Step 308 are shown in the flowchart in FIG. 8. In this process, the driving direction of stepping motor 44 is first set to the reverse direction, and then the flow goes from Step 401 to Step 402. Then, since the rear lens group 28 is moved forward by a pulse at following Step 406, "1" is preliminarily subtracted from the rear lens group cumulative pulse number (Step 402). Next, "1" is subtracted from the value of RLG pointer corresponding to a phase of stepping motor 44 at the present time (Step 403), and the stepping motor 44 is driven to a next phase at Step 406. In case the value of RLG pointer is negative, "3" is set as the value of RLG pointer (Steps 404,405).

When at Step 406 a pulse signal according to the value of RLG pointer is output, the rotator 45 of stepping motor 44 is reversed by a pulse, as described previously, whereby the rear lens group 28 moves forward. Then, a lapse of constant time is waited for (Steps 407, 408), and "1" is subtracted from the value of rear lens group (RLG) drive counter (Step 409). In this case, since "4" is initially set in the RLG drive counter, above Steps 401 to 409 are repeated four times, and this processing is ended when the value of RLG drive counter becomes "0" (Step 410). As a result, the stepping motor 44 is driven four pulses in the reverse direction.

After completion of the rear lens group N pulse drive process, the conventional apparatus soon detects on or off of home position sensor 36, but the apparatus of the invention makes a decision as to if the rear lens group cumulative pulse number is not more than a predetermined value ("10" in the present embodiment) (Step 309) and if the decision is negative (NO) the flow proceeds to a process to determine whether the value of HP check drive counter is not more than "180" (Step 310). Namely, if the rear group cumulative pulse number is proper and if the rear group cumulative pulse number is greater than "10", it is judged that the rear lens group 28 is too far to execute the home position check, and the flow proceeds to Step 310 without performing the on/off detection of home position sensor 36.

Every four pulse drive of stepping motor 44, "1" is added to the HP check drive counter (Step 307). If the value of this counter is not more than "180", there is a possibility that the rear lens group 28 has not reached the home position yet. This is because 720 pulse signals (180 counters) must be supplied to the stepping motor 44 before the rear lens group 28 reaches the home position from the farthest therefrom. If the rear lens group cumulative pulse number is larger than "10" and if the HP check drive counter is not more than "180", it can be considered that the rear lens group 28 has not reached the home position yet and therefore Steps 306 to 310 are repeated. Even if the rear lens group cumulative pulse number is greater than "10" but if the HP check drive counter exceeds "180", it can be considered that there is something abnormal, and the flow proceeds to Step 311 to set an HP detection error flag.

If the rear lens group cumulative pulse number becomes not more than "10", the home position sensor 36 should be on after several repetitions of RLG N pulse drive process if normal. Because the stepping motor 44 is not stable yet right after the rear group N pulse drive process at Step 308, a lapse of 10 ms is waited for at Step 312 and thereafter whether the home position sensor 36 is on or off is detected (Steps 313–315). Since there is a possibility of error operation, whether the home position sensor 36 is on or off is again detected in this embodiment 2 ms after first on detection of the home position sensor 36.

If the home position sensor 36 is off, a decision is made as to if a value of HP check drive counter is not more than "180" (Step 310). If the home position sensor 36 is off and if the HP check drive counter is not more than "180", it can be considered that the rear lens group 28 has not reached the home position yet, and therefore the RLG N pulse drive (Steps 306–308) and the on/off detection of home position sensor 36 (Steps 313–315) are repeated. Then, if the home position sensor 36 is off and if the HP check drive counter exceeds "180", an HP detection error flag is set under an assumption that there is something abnormal in drive of rear lens group 28 (Step 311), and the flow leaves this process.

On the other hand, if the value of HP check drive counter is within "180" and if the home position sensor 36 is turned on, it seems normal and then the rear lens group 28 is moved to the standby position several pulses away from the home position to the camera body 7. Here, suppose the rear lens group is moved eight pulses. First, the drive direction of stepping motor 44 is set to the normal rotation direction (Step 316) and "8" is set in the RLG drive counter (Step 317). Then, the RLG N pulse drive process is executed (Step 318) and thereafter the flow waits for about 10 ms to stabilize the energization state of stepping motor 44 (Step 319). In the RLG N pulse drive process, Steps 401 to 410 are repeated eight times in a route of from Step 401 to Step 412 in FIG. 8.

When the rear lens group 28 is moved to the standby position as described, the home position sensor 36 is turned off if there is nothing abnormal. However, if the home position sensor 36 is still kept on even after the double on/off detections of the home position sensor 36 (Steps 320 to 322), an HP detection error flag is set under an assumption that there is something abnormal (Step 311).

If the home position sensor 36 is off at Steps 320 to 322, which is normal, the flow leaves the RLG HP drive process without setting an HP detection error flag.

As described above, the on/off detection of home position sensor 36 is started when the rear lens group 28 comes closer to the home position to some extent, so that the home position check can be performed within a shorter time than that by the conventional method as previously described.

After completion of the above RLG HP drive process, a decision is made at Step 205 in FIGS. 5A and 5B as to if an HP detection error flag is present or absent. If the drive of rear lens group 28 is normal, the HP detection error flag should not be set. Thus, to retract the lens barrel 4 to the retracted position, the drive direction of front lens group 22 is set to the wide-angle (WIDE) side (Step 206), and the DC motor (FLG motor) 42 is actuated (Step 207). After the DC motor 42 is actuated, the moving barrel 10 and intermediate barrel 8 are retracted into the stationary barrel 6 as described previously. During the retracting operation of lens barrel 4, the position sensor 24 detects the position of front lens group 22, i.e., the position of lens barrel 4 (Step 208), and when the lens barrel 4 reaches the retracted position (Step 210), a brake is applied to the DC motor 42 (Step 211).

In this case, the rear lens group 28 is located at the standby position near the home position, and a positional relation between the rear lens group 28 and the front lens group 22 is approximately the state as shown in FIG. 1A. Accordingly, it can be understood that when the lens barrel 4 is retracted to the retracted position while maintaining this positional state of the front and rear lens groups 22, 28, the rear lens group 28 will never contact the film F.

On the other hand, if the HP detection error flag is set with an abnormality found in the RLG HP drive process, the flow proceeds from Step 205 to Step 212 to set a WIDE end drive flag. With this flag set, the DC motor 42 is driven to retract the lens barrel 4 similarly as in the above process (Steps 206, 207), and when the front lens group 22 reaches the wide-angle (WIDE) end (Steps 209, 213), a brake is applied to the DC motor 42 (Step 211). Therefore, the front lens group 22 stops at the position of WIDE end as shown in FIG. 1B, if there is something abnormal in drive of RLG 28 or in the home position sensor 36.

After that, the WIDE end drive flag is cleared (Step 214), the drive power source for zoom system 2 is turned off (Step 215), it is checked if the main switch (SM) is off (Step 216), and the process is ended.

As described above, the present invention is characterized in that the detection as to if the rear lens group 28 is properly located at the home position is performed only after the rear lens group 28 reaches a predetermined position near the home position. In the conventional method, such detection was repeated immediately after movement start of rear lens group 28, resulting in performing unnecessary processes if there is no abnormality in the camera. The present invention excludes such unnecessary processes so as to shorten the time necessary for the entire processing of home position check.

As a result, for example in case the home position check is executed when the lens barrel is driven from the retracted position to the photographable range, such an advantage can be attained that a waiting time is shorter before a photographable state is achieved and therefore a user can soon start shooting.

Although the above embodiment concerned the home position check upon retracting the lens barrel, the home position check is also executed for example in driving the lens barrel 4 from the retracted position to the photographable range and the present invention can be applied to such a case.

Further, the lens barrel 4 of zoom system 2 in the above embodiment is of the three barrel arrangement composed of the stationary barrel 6, the intermediate barrel 8 and the moving barrel 8, but the present invention can be also applied to a two barrel structure composed of a stationary barrel and a moving barrel.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A camera comprising:

a camera body;

a front lens group arranged as movable backward and forward relative to said camera body;

a rear lens group disposed between said camera body and said front lens group as movable backward and forward relative to said camera body;

a stepping motor for driving said rear lens group;

rear lens group position detecting means for detecting a position of said rear lens group, based on a cumulative number of pulse signals output to said stepping motor to move said rear lens group, the cumulative number being a certain value when said rear lens group is located at a home position; and home position check means for detecting whether said rear lens group is properly located at said home position, said home position check means including stepping motor driving means for driving said stepping motor so that said rear lens group is located at said home position, and home position detecting means for detecting whether said rear lens group is located at said home position, wherein, during an operation of said stepping motor driving means, said rear lens group position detecting means is adapted to detect a position of said rear lens group every time said stepping motor is driven by a predetermined number of pulses, and only when said rear lens group position detecting means detects that said rear lens group is positioned between said home position and a predetermined position, said home position detecting means executes a detection as to if said rear lens group is located at said home position every time said stepping motor is driven by a predetermined number of pulses.

2. A camera according to claim 1, wherein said home position is a position where said rear lens group is located closest to said front lens group.

3. A camera according to claim 2, wherein said predetermined position is a position near said home position.

4. A camera according to claim 3, wherein said predetermined position is a position between said home position and a middle of a range within which said rear lens group can be moved relative to said front lens group.

5. A camera according to claim 1, wherein said home position check means includes counting means for counting every time said stepping motor is driven by the predetermined number of pulses during the operation of said stepping motor driving means, and abnormality detecting means for detecting an abnormal state in drive of said rear lens group, said abnormality detecting means being adapted to detect said abnormal state by detecting that a value counted by said counting means is over a predetermined value.

6. A camera according to claim 1, comprising a lens barrel arranged as movable backward and forward relative to said camera body, wherein said front lens group is mounted in a front end portion of said lens barrel, and wherein said rear lens group is disposed in said barrel behind said front lens group so as to be independently movable backward and forward.

7. A camera according to claim 6, wherein said rear lens group position detecting means is adapted to detect a position of said rear lens group with respect to said lens barrel.

8. A camera according to claim 6, wherein said home position check means is executed upon retracting said lens barrel into said camera body.

9. A camera according to claim 6, wherein said home position check means is executed upon moving said lens barrel from a retracted position to a photographable range.

10. A home position check apparatus for use in a camera having a camera body, a front lens group arranged as movable backward and forward relative to said camera body, a rear lens group disposed between said camera body and said front lens group as movable backward and forward relative to said camera body, a stepping motor for driving said rear lens group, and rear lens group position detecting means for detecting a position of said rear lens group, based on a cumulative number of pulse signals output to said stepping motor to move said rear lens group, the cumulative number being a certain value when said rear lens group is located at a home position, said home position check apparatus for detecting whether said rear lens group is properly located at said home position, comprising:

stepping motor driving means for driving said stepping motor so that said rear lens group is located at said home position; and home position detecting means for detecting whether said rear lens group is located at said home position, wherein, during an operation of said stepping motor driving means, said rear lens group position detecting means is adapted to detect a position of said rear lens group every time said stepping motor is driven by a predetermined number of pulses, and only when said rear lens group position detecting means detects that said rear lens group is positioned between said home position and a predetermined position, said home position detecting means executes a detection as to if said rear lens group is located at said home position every time said stepping motor is driven by a predetermined number of pulses.

11. A home position check apparatus according to claim 10, wherein said home position is a position where said rear lens group is located closest to said front lens group.

12. A home position check apparatus according to claim 11, wherein said predetermined position is a position near said home position.

13. A home position check apparatus according to claim 12, wherein said predetermined position is a position between said home position and a middle of a range within which said rear lens group can be moved relative to said front lens group.

14. A home position check apparatus according to claim 10, comprising counting means for counting every time said stepping motor is driven by the predetermined number of pulses during the operation of said stepping motor driving means, and abnormality detecting means for detecting an abnormal state in drive of said rear lens group, said abnormality detecting means being adapted to detect said abnormal state by detecting that a value counted by said counting means is over a predetermined value.

15. A home position check method for use in a camera having a camera body, a front lens group arranged as movable backward and forward relative to said camera body, a rear lens group disposed between said camera body and said front lens group as movable backward and forward relative to said camera body, a stepping motor for driving said rear lens group, and rear lens group position detecting means for detecting a position of said rear lens group, based on a cumulative number of pulse signals output to said stepping motor to move said rear lens group, the cumulative number being a certain value when said rear lens group is located at a home position, said home position check method comprising the steps of:

driving said stepping motor so that said rear lens group is located at said home position;

detecting whether said rear lens group is located at said home position;

detecting a position of said rear lens group every time said stepping motor is driven by a predetermined number of pulses; and detecting as to if said rear lens group is located at said home position every time said stepping motor is driven by a predetermined number of pulses, only when detecting that said rear lens group is positioned between said home position and a predetermined position.

16. A home position check method according to claim 15, wherein said home position is a position where said rear lens group is located closest to said front lens group.

17. A home position check method according to claim 16, wherein said predetermined position is a position near said home position.

18. A home position check method according to claim 17, wherein said predetermined position is a position between said home position and a middle of a range within which said rear lens group can be moved relative to said front lens group.

19. A home position check method according to claim 15, comprising steps of:

counting every time said stepping motor is driven by the predetermined number of pulses; and detecting an abnormal state in drive of said rear lens group by detecting that the counted value is over a predetermined value.

* * * * *